US012291265B2

(12) United States Patent
Tokuhiro

(10) Patent No.: US 12,291,265 B2
(45) Date of Patent: *May 6, 2025

(54) PARKING ASSIST METHOD AND PARKING ASSIST DEVICE

(71) Applicant: PANASONIC AUTOMOTIVE SYSTEMS CO., LTD., Kanagawa (JP)

(72) Inventor: Takafumi Tokuhiro, Kanagawa Ken (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/737,424

(22) Filed: Jun. 7, 2024

(65) Prior Publication Data
US 2024/0326912 A1 Oct. 3, 2024

Related U.S. Application Data

(63) Continuation of application No. 17/813,228, filed on Jul. 18, 2022, now Pat. No. 12,037,043.

(30) Foreign Application Priority Data

Sep. 16, 2021 (JP) ................. 2021-151489

(51) Int. Cl.
B62D 15/02 (2006.01)
B60W 30/06 (2006.01)
(Continued)

(52) U.S. Cl.
CPC .......... *B62D 15/028* (2013.01); *B60W 30/06* (2013.01); *B60W 50/14* (2013.01); *G06V 20/586* (2022.01);
(Continued)

(58) Field of Classification Search
None
See application file for complete search history.

(56) References Cited

U.S. PATENT DOCUMENTS 7,307,655 B1 12/2007 Okamoto et al.
12,037,043 B2 * 7/2024 Tokuhiro ........... B62D 15/0285
(Continued)

FOREIGN PATENT DOCUMENTS

CN 111016884 4/2020
CN 111413959 7/2020
(Continued)

OTHER PUBLICATIONS

Office Action from Japan Patent Office (JPO) in Japanese Patent Appl. No. 2021-151489, dated Oct. 29, 2024, together with an English language translation.

(Continued)

*Primary Examiner* — Thomas S McCormack
(74) *Attorney, Agent, or Firm* — Greenblum and Bernstein, P.L.C.

(57) ABSTRACT

A parking assist method according to the present disclosure is for performing autonomous driving of a vehicle on the basis of teacher driving by a driver. The parking assist method includes acquiring, from an imaging device installed in the vehicle, captured images obtained by imaging periphery of the vehicle in time series according to movement of the vehicle during the teacher driving. The method includes recording a travel route of the vehicle in the teacher driving, and generating, on the basis of the captured images, a first enlarged overhead image of a display target range viewed from above. The display target range covers the travel route and a periphery of the travel route. The method further includes causing a display device to display the first enlarged overhead image.

18 Claims, 10 Drawing Sheets

(51) Int. Cl.
*B60W 50/14* (2020.01)
*G06V 20/58* (2022.01)

(52) U.S. Cl.
CPC . *B60W 2050/146* (2013.01); *B60W 2420/403* (2013.01); *B60W 2540/215* (2020.02)

(56) References Cited

U.S. PATENT DOCUMENTS

2018/0246515 A1   8/2018   Iwama et al.
2019/0184981 A1   6/2019   Jung et al.

FOREIGN PATENT DOCUMENTS

| CN | 113276844   | 8/2021 |
| JP | 10-114273   | 5/1998 |
| JP | 3286306     | 5/2002 |
| JP | 2004-099015 | 4/2004 |
| JP | 2020-500767 | 1/2020 |

OTHER PUBLICATIONS

Office Action from Japan Patent Office (JPO) in Japanese Patent Appl. No. 2021-151489, dated Jan. 14, 2025, together with an English language translation.

* cited by examiner

PARKING ASSIST METHOD AND PARKING ASSIST DEVICE

CROSS-REFERENCE TO RELATED APPLICATIONS

This is a Continuation of U.S. patent application Ser. No. 17/813,228, filed Jul. 18, 2022, which claims the benefit of priority from Japanese Patent Application No. 2021-151489, filed Sep. 16, 2021. The disclosure of each of these documents, including the specification, drawings, and claims, is incorporated herein by reference in its entirety.

FIELD

The present disclosure relates generally to a parking assist method and a parking assist device.

BACKGROUND

Conventionally, parking assist technology for moving a vehicle by autonomous driving when parking the vehicle has been known. One of the parking assist technology is implemented by learning a travel route on the basis of teacher driving by the driver and using results of the learning for performing parking assist (for example, Japanese Patent Publication No. 3286306). Such technology is utilized for, for example, a case when a user repeatedly parks in a fixed parking position, such as a parking lot of his/her home or office.

However, it has sometimes been difficult for the user to objectively understand the positional relationship between the travel route of the vehicle based on teacher driving, and objects and roads around the vehicle.

The present disclosure provides a parking assist method and a parking assist device that enable a user to easily understand the positional relationship between the travel route of the vehicle based on teacher driving, and objects and roads around the vehicle.

SUMMARY

A parking assist method according to the present disclosure is for performing autonomous driving of a vehicle on the basis of teacher driving by a driver. The parking assist method includes performing a first acquisition step of acquiring, from an imaging device installed in the vehicle, captured images obtained by imaging periphery of the vehicle in time series according to movement of the vehicle during the teacher driving. The parking assist method includes performing a route recording step of recording a travel route of the vehicle in the teacher driving, and performing a first enlarged overhead image generation step of generating, on the basis of the captured images, a first enlarged overhead image of a display target range viewed from above. The display target range covers the travel route and periphery of the travel route. The parking assist method further includes performing a first display step of causing a display device to display the first enlarged overhead image.

DETAILED DESCRIPTION

Embodiments of a parking assist method and a parking assist device according to the present disclosure will be described with reference to the drawings.

First Embodiment

Figure 1:
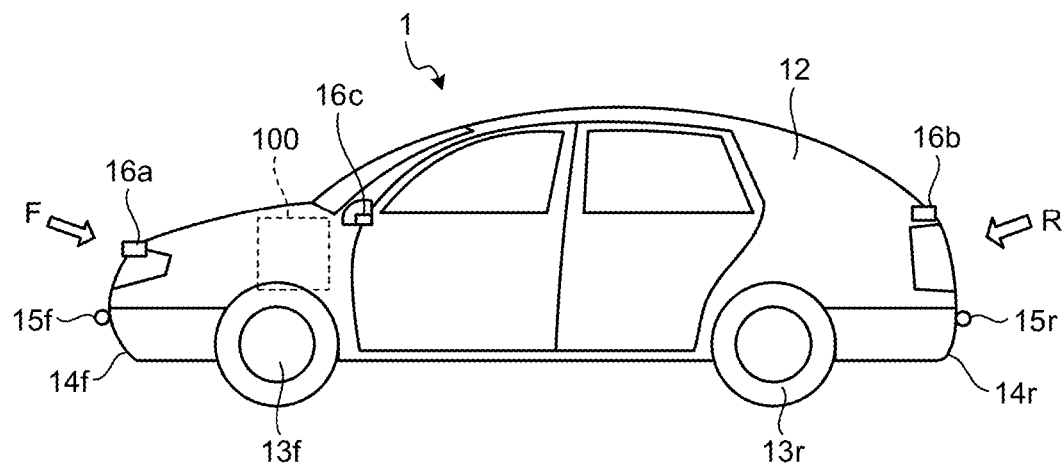
FIG. 1 is a diagram illustrating an example of a vehicle provided with a parking assist device according to a first embodiment.

FIG. 1 is a diagram illustrating an example of a vehicle 1 provided with a parking assist device 100 according to a first embodiment. As illustrated in FIG. 1, the vehicle 1 is provided with a vehicle body 12, and two pairs of wheels 13 arranged along a predetermined direction on the vehicle body 12. The two pairs of wheels 13 contain a pair of front tires 13$f$ and a pair of rear tires 13$r$.

The front tire 13$f$ illustrated in FIG. 1 is an example of a first wheel according to the present embodiment. Moreover, the rear tire 13$r$ is an example of a second wheel according to the present embodiment. Note that, while the vehicle 1 illustrated in FIG. 1 is provided with four wheels 13, the number of wheels 13 is not limited to this case. For example, the vehicle 1 may be a two-wheeled vehicle.

The vehicle body 12 is coupled to the wheels 13 and is capable of moving by the wheels 13. In this case, the predetermined direction in which the two pairs of wheels 13 are oriented is the travel direction of the vehicle 1. The vehicle 1 is capable of advancing and retreating through switching of gears (not illustrated), or the like. Moreover, the vehicle 1 is capable of turning left and right through steering.

In addition, the vehicle body 12 has a front end portion F, which is the end on the front tire 13f side, and a rear end portion R, which is the end on the rear tire 13r side. The vehicle body 12 has an approximately rectangular shape in a top view, and the four corner portions of the substantially rectangular shape will sometimes be referred to as ends. Moreover, although not illustrated in FIG. 1, the vehicle 1 is provided with a display device, a loudspeaker, and an operation unit.

One pair of bumpers 14 are provided in the vicinity of the lower end of the vehicle body 12, which are the front end portion F and the rear end portion R of the vehicle body 12. Of the one pair of bumpers 14, a front bumper 14f covers a portion of the lateral surface and the whole of the front surface in the vicinity of the lower end portion of the vehicle body 12. Of the one pair of bumpers 14, a rear bumper 14r covers a portion of the lateral surface and the whole of the rear surface in the vicinity of the lower end portion of the vehicle body 12.

Transceivers 15f and 15r, which transmit and receive sound waves such as ultrasonic waves, are arranged at a predetermined end of the vehicle body 12. For example, one or more transceivers 15f are arranged on the front bumper 14f, and one or more transceivers 15r are arranged on the rear bumper 14r. When there are no particular limitations on the transceivers 15f and 15r, the same are simply referred to as a transceivers 15. Moreover, the number and the positions of the transceivers 15 are not limited to the example illustrated in FIG. 1. For example, the vehicle 1 may be provided with transceivers 15 on the left and right sides.

Although sonar using ultrasonic waves is described as an example of the transceivers 15 in the present embodiment, the transceivers 15 may also be radars that transmit and receive electromagnetic waves. Alternatively, the vehicle 1 may be provided with both sonar and radar. Further, the transceivers 15 may simply be referred to as sensors.

The transceivers 15 detect obstacles around the vehicle 1 on the basis of the results of transmitting/receiving sound waves or electromagnetic waves. Moreover, the transceivers 15 measure the distance between the vehicle 1 and obstacles around the vehicle 1 on the basis of the results of transmitting/receiving sound waves or electromagnetic waves.

The vehicle 1 includes a first imaging device 16a that images the front of the vehicle 1, a second imaging device 16b that images the rear of the vehicle 1, a third imaging device 16c that images the left side of the vehicle 1, and a fourth imaging device that images the right side of the vehicle 1. Illustration of the fourth imaging device is omitted.

When there is no particular distinction to be made, the first imaging device 16a, the second imaging device 16b, the third imaging device 16c, and the fourth imaging device are referred to simply as an imaging devices 16. The positions and quantity of imaging devices are not limited to or by the example illustrated in FIG. 1. For example, the vehicle 1 may be provided with two devices alone, namely, the first imaging device 16a and the second imaging device 16b. Alternatively, the vehicle 1 may be provided with another imaging device in addition to those in the above-described example.

The imaging devices 16 are cameras that are capable of capturing images around the vehicle 1, such as color images, for example. Note that the captured images captured by the imaging devices 16 may be moving images or still images. Moreover, the imaging devices 16 may be cameras built into the vehicle 1, or drive recorder cameras or the like which are retrofitted to the vehicle 1.

The parking assist device 100 is also built into the vehicle 1. The parking assist device 100 is an information processing device that can be built into the vehicle 1, such as, for example, an electronic control unit (ECU) or an on-board unit (OBU) which is provided inside the vehicle 1. Alternatively, the parking assist device 100 may be an external device that is provided in the vicinity of the dashboard of the vehicle 1. Note that the parking assist device 100 may also serve as a car navigation device, or the like.

Figure 2:
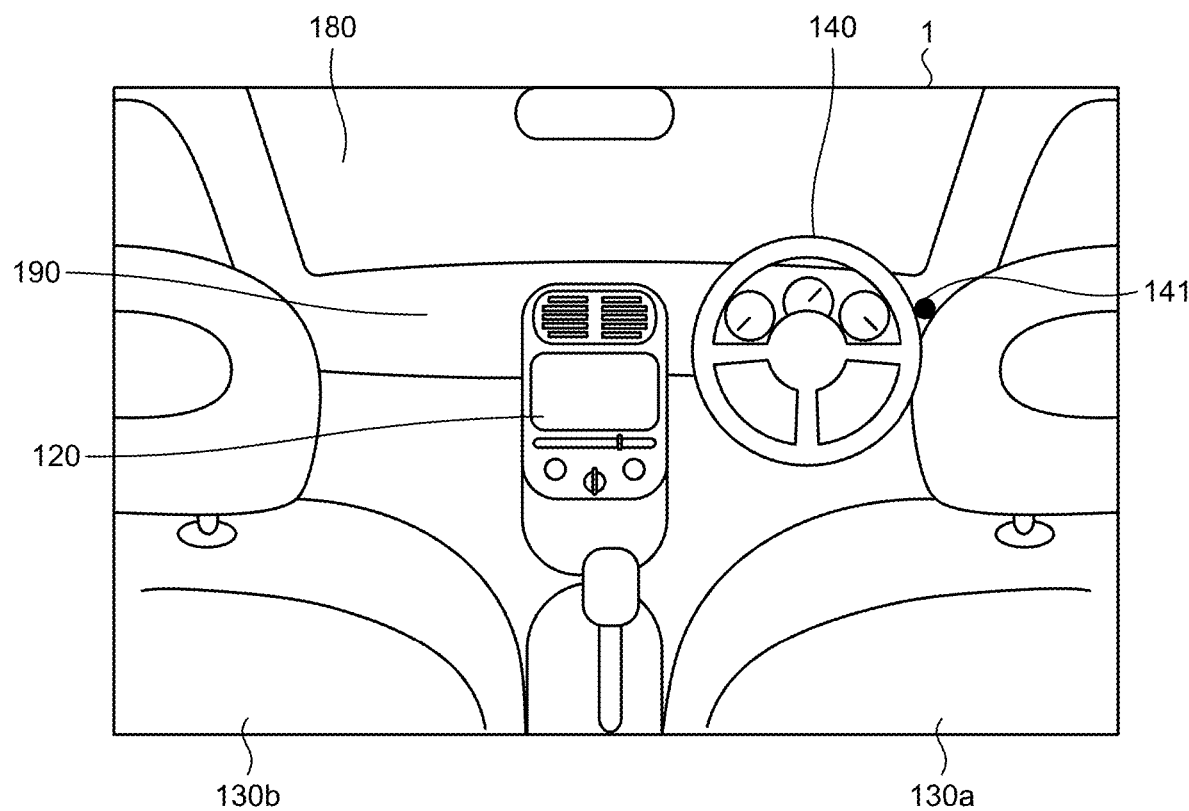
FIG. 2 is a diagram illustrating an example of a configuration in the vicinity of a vehicle driving seat according to the first embodiment.

The configuration in the vicinity of the driving seat of the vehicle 1 according to the present embodiment will be described next. FIG. 2 is a diagram illustrating an example of a configuration in the vicinity of a driving seat 130a of the vehicle 1 according to the first embodiment.

As illustrated in FIG. 2, the vehicle 1 is provided with the driving seat 130a and a passenger seat 130b. In front of the driving seat 130a, a windshield 180, a dashboard 190, a steering wheel 140, a display device 120, and an operation button 141 are provided.

The display device 120 is a display installed in the dashboard 190 of the vehicle 1. The display device 120 is, for example, located in the center of the dashboard 190, as illustrated in FIG. 2. The display device 120 is, for example, a liquid crystal display, or an organic electroluminescence (EL) display. The display device 120 may also serve as a touch panel. The display device 120 is an example of a display unit according to the present embodiment.

Moreover, the steering wheel 140 is provided in the front surface of the driving seat 130a and can be operated by the driver. The angle of rotation, that is, the steering angle, of the steering wheel 140 is electrically or mechanically linked to the change in direction of the front tires 13f, which are the steered wheels. Note that the steered wheels may be the rear tires 13r, or both the front tires 13f and the rear tires 13r may be the steered wheels.

The operation button 141 is a button that enables operations by the user to be received. Note that, in the present embodiment, the user is, for example, the driver of the vehicle 1. The operation button 141 receives an operation from the driver to start parking assist, for example, by receiving a press from the driver. Note that the position of the operation button 141 is not limited to or by the example illustrated in FIG. 2, and may be provided on the steering wheel 140, for example. The operation button 141 is an example of the operating unit according to the present embodiment. Further, when the display device 120 also serves as a touch panel, the display device 120 may also be an example of the operating unit. Moreover, an operation terminal capable of transmitting a signal to the vehicle 1 from outside the vehicle 1, such as a tablet terminal, a smartphone, a remote controller, or an electronic key (not illustrated), may also be used as an example of the operation unit.

Figure 3:
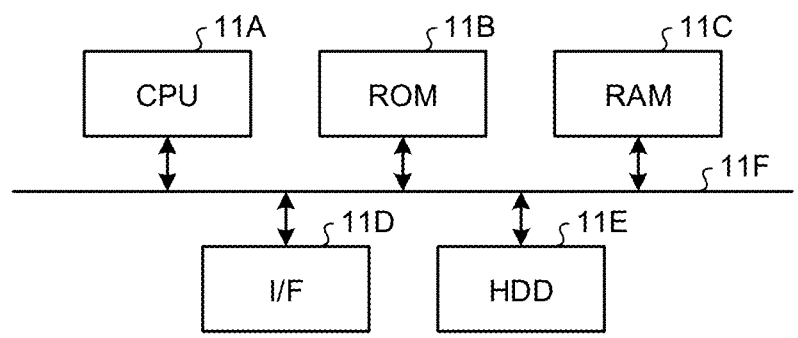
FIG. 3 is a diagram illustrating an example of a hardware configuration of the parking assist device according to the first embodiment.

Next, the hardware configuration of the parking assist device 100 will be described. FIG. 3 is a diagram illustrating an example of the hardware configuration of the parking assist device 100 according to the first embodiment. As illustrated in FIG. 3, the parking assist device 100 has a hardware configuration that utilizes an ordinary computer, in which a central processing unit (CPU) 11A, a read-only memory (ROM) 11B, a random-access memory (RAM) 11C, an interface (I/F) 11D, a hard disk drive (HDD) 11E, or the like, are connected to each other by a bus 11F.

The CPU 11A is a computation device that controls the whole ECU. Note that the CPU 11A is an example of a processor in the parking assist device 100 according to the present embodiment, and that another processor or processing circuit may also be provided in place of the CPU 11A. The ROM 11B stores programs and the like that implement various types of processing by the CPU 11A. The RAM 11C is, for example, the main storage device of the parking assist device 100, and stores the data necessary for various types of processing by the CPU 11A. The I/F 11D is an interface for transmitting and receiving data. The I/F 11D transmits and receives data to and from another device installed in the vehicle 1 such as, for example, the display device 120. In addition, the I/F 11D may transmit and receive information to and from another ECU mounted in the vehicle 1 over a controller area network (CAN) or the like in the vehicle 1, or may communicate with an information processing device outside the vehicle 1 over a network such as the Internet.

Note that, in FIGS. 1 to 3, the display device 120 is illustrated as a device that is separate from the parking assist device 100, but the display device 120 may be included in the parking assist device 100.

The parking assist device 100 according to the present embodiment learns the travel route on the basis of the teacher driving by the driver, and performs parking assist by using the learning result. In other words, the parking assist method executed by the parking assist device 100 is a method for performing autonomous driving of the vehicle 1 on the basis of teacher driving by the driver. Such a parking assist method is effective for reducing the labor of parking of the driver, for example, when parking is repeatedly performed at a determined parking position such as a garage at the home of the driver, a contracted parking position of an apartment building, or a prescribed parking position in a parking lot such as a work place. Such parking assist is called home zone parking.

Figure 4:
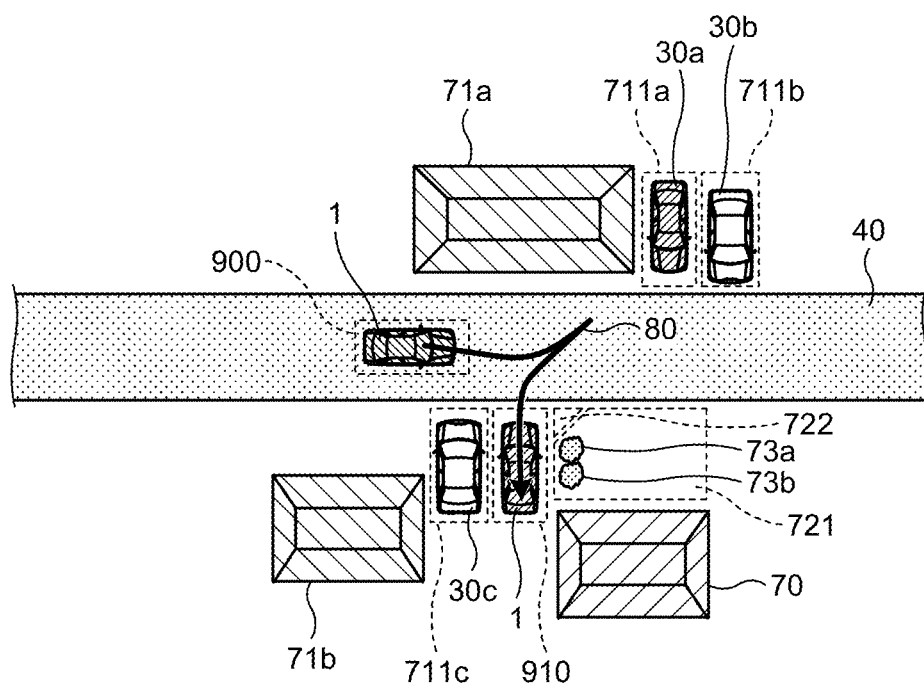
FIG. 4 is a diagram illustrating an example of teacher driving according to the first embodiment.

FIG. 4 is a diagram illustrating an example of teacher driving according to the first embodiment. In the example illustrated in FIG. 4, a parking space 910 located near a home 70 of a driver of the vehicle 1 is a target parking position of the vehicle 1. In addition, a garden 721 and a corner space 722 are located near the parking space 910. In the garden 721, there are trees 73a and 73b on the side facing the parking space 910.

In addition, around the parking space 910, there are other residences 71a and 71b, parking spaces 711a to 711c of the other residences 71a and 71b, and other vehicles 30a to 30c, and the like. The trees 73a and 73b in the garden 721, the other residences 71a and 71b, the parking spaces 711a to 711c of the other residences 71a and 71b, and the other vehicles 30a to 30c, and the like, can be obstacles when the vehicle 1 is parked in the parking space 910. For this reason, during teacher driving, the driver causes the vehicle 1 to travel while avoiding the foregoing obstacles. Note that objects that can be obstacles to the vehicle 1 are not limited to the foregoing.

In teacher driving, the driver drives the vehicle 1 from a start position 900 on a road 40 to the parking space 910 by manual driving. The parking assist device 100 records a travel route 80 from the start position 900 to the parking space 910 during the teacher driving. When the travel route 80 for autonomous driving is determined as the recorded travel route 80 by the user, the parking assist device 100 registers the travel route 80 as the travel route 80 for autonomous driving. Note that the user may repeat the teacher driving plural times until the desired travel route 80 is obtained.

After completing registration of the travel route 80 by the teacher driving, the parking assist device 100 is able to park the vehicle 1 in the parking space 910 by causing the vehicle 1 to autonomously travel on the registered travel route 80.

Note that the parking space 910 and the peripheral environment thereof illustrated in FIG. 4 are merely examples, and the present invention is not limited thereto.

Figure 5:
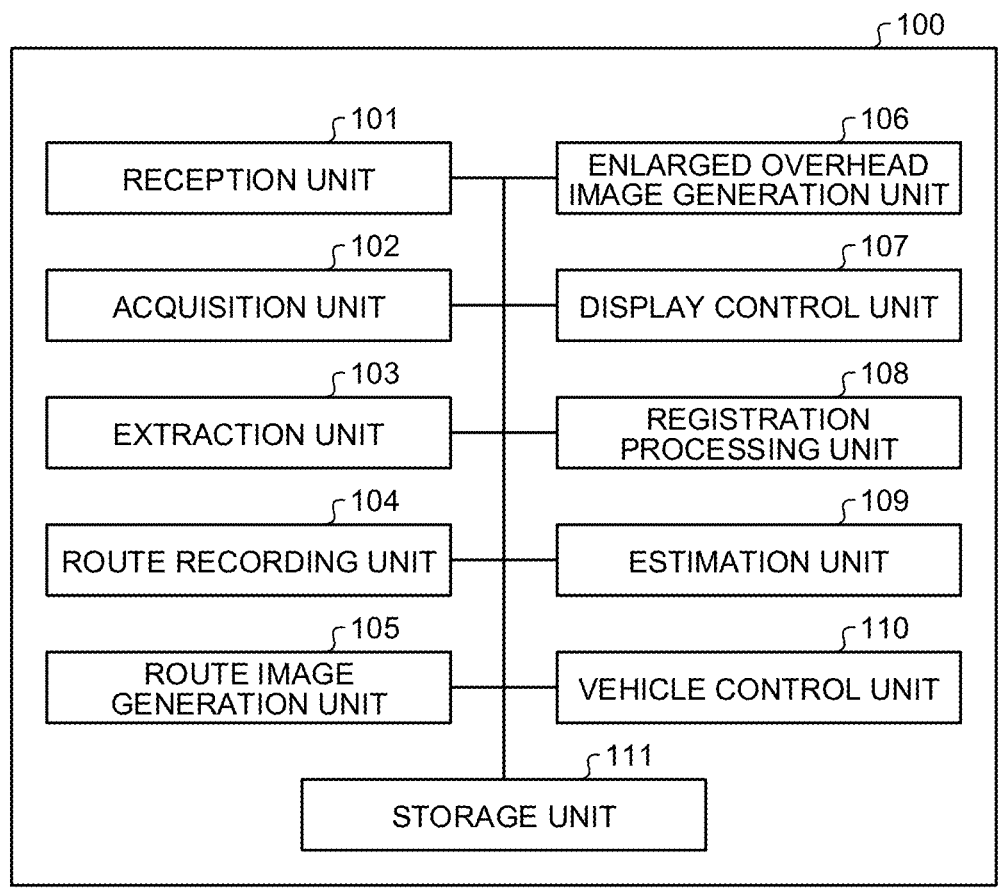
FIG. 5 is a block diagram illustrating an example of the functions of the parking assist device according to the first embodiment.

The details of the functions of the parking assist device 100 according to the present embodiment will be described next. FIG. 5 is a block diagram illustrating an example of the functions of the parking assist device 100 according to the first embodiment.

As illustrated in FIG. 5, the parking assist device 100 according to the present embodiment includes a reception unit 101, an acquisition unit 102, an extraction unit 103, a route recording unit 104, a route image generation unit 105, an enlarged overhead image generation unit 106, a display control unit 107, a registration processing unit 108, an estimation unit 109, a vehicle control unit 110, and a storage unit 111.

The storage unit 111 is configured by, for example, a ROM 11B, a RAM 11C, or an HDD 11E. Note that, although FIG. 5 illustrates that one storage unit 111 is included in the parking assist device 100, a plurality of storage media may function as the storage unit 111.

The storage unit 111 stores programs and data used in various processing to be executed by the parking assist device 100. For example, the program executed by the parking assist device 100 according to the present embodiment has a module configuration that includes the above-described functional units (the reception unit 101, the acquisition unit 102, the extraction unit 103, the route recording unit 104, the route image generation unit 105, the enlarged overhead image generation unit 106, the display control unit 107, the registration processing unit 108, the estimation unit 109, and the vehicle control unit 110), and as actual hardware, the CPU 11A reads the program from the storage unit 111 and executes the program, and thus the respective units are loaded onto the RAM 11C, and the reception unit 101, the acquisition unit 102, the extraction unit 103, the route recording unit 104, the route image generation unit 105, the enlarged overhead image generation unit 106, the display control unit 107, the registration processing unit 108, the estimation unit 109, and the vehicle control unit 110 are generated on the RAM 11C. Note that the processing realized by each functional unit of the parking assist device 100 is also referred to as a step.

The program executed by the parking assist device 100 according to the present embodiment is provided as a file in an installable format or an executable format, and is recorded on a computer-readable recording medium such as a CD-ROM, flexible disk (FD), CD-R, or DVD (Digital Versatile Disk).

Moreover, the program executed by the parking assist device 100 according to the present embodiment may be configured to be stored on a computer connected to a network such as the internet or to be provided by being downloaded over the network. Moreover, the program executed by the parking assist device 100 according to the present embodiment may also be configured so as to be provided or distributed via a network such as the Internet. In addition, the program executed by the parking assist device 100 according to the present embodiment may be configured to be provided pre-installed on the ROM 11B, or the like.

The reception unit 101 receives various operations from the user. For example, when the operation button 141 is pressed, the reception unit 101 receives an operation by the user to start and end recording of the teacher driving. In the present embodiment, in a case where a start operation reception step, which is processing to receive an operation to start recording of the teacher driving, and an end operation reception step which is processing to receive an operation to end recording of the teacher driving are collectively referred to as start-end operation reception steps.

In addition, after the end of teacher driving, the reception unit 101 receives a user operation giving an instruction on whether or not to register the travel route 80 of the teacher driving as the travel route 80 for autonomous driving.

Moreover, for example, when the operation button 141 is pressed in a state where the travel route 80 has been registered, the reception unit 101 receives an operation by the user to start parking assist.

Note that there are no particular limitations on the means with which the reception unit 101 receives a user operation. For example, in a case where the display device 120 is a touch panel, when an image button on the touch panel is pressed, the reception unit 101 may receive an operation to start and end recording of teacher driving or to start parking assist.

The acquisition unit 102 acquires, from the imaging devices 16a to 16c, captured images obtained by imaging the periphery of the vehicle 1 in time series according to movement of the vehicle 1 during the teacher driving. Note that, the captured image is an image obtained by imaging the periphery of the vehicle 1, so that the captured image is referred to as a peripheral image in the present embodiment. The acquisition processing is an example of a first acquisition step in the present embodiment. Moreover, in the first acquisition step, the acquisition unit 102 also acquires information about the distance between objects around the vehicle 1 and the vehicle at the time of teacher driving.

The information on the distance between the objects around the vehicle 1 and the vehicle represents, for example, the presence or absence of obstacles detected by the transceivers 15 and the lengths of the distances between the detected obstacles around the vehicle 1 and the vehicle 1. The presence or absence of obstacles detected by the transceivers 15 and the distances between the vehicle 1 and the obstacles around the vehicle 1 measured by the transceivers 15 may be referred to as environmental information on the environment around the vehicle 1. Note that the environment information is not limited to these pieces of information.

In addition, the acquisition unit 102 acquires vehicle information of the vehicle 1 from various sensors or other ECUs of the vehicle 1. Vehicle information includes, for example, information relating to the speed, steering angle, and braking operation of the vehicle 1. Each piece of information included in the vehicle information of the vehicle 1 is stored in the storage unit 111 in association with the time when each piece of information is detected. Note that the vehicle information of the vehicle 1 may further include the wheel speed, the rotational speed of the wheels 13, the acceleration of the vehicle 1 measured by a gyro sensor or the like, and the like.

The extraction unit 103 extracts feature points from the peripheral images. There are no particular limitations on the technique used by the extraction unit 103 to extract feature points, and any known technique may be applied. For example, the extraction unit 103 extracts feature points by using technology such as FAST (Features from Accelerated Segment Test) or ORB (Oriented FAST and Rotated BRIEF). Moreover, at the time of learning the travel route 80, the extraction unit 103 may preferentially record a feature point that satisfies a prescribed condition among the extracted feature points. For example, a feature point extracted from one of the peripheral images continuing in time series, for which the driving distance of the vehicle 1 is longer, may be preferentially selected.

The route recording unit 104 records the travel route 80 of the vehicle 1 in teacher driving. The route recording unit 104 estimates the position of the vehicle 1 during teacher driving on the basis of, for example, changes in feature points extracted from the peripheral images and vehicle information of the vehicle 1. The route recording unit 104 then specifies the travel route 80 on the basis of temporal changes in the position. The recording processing of the travel route 80 is an example of a route recording step.

More specifically, the route recording unit 104 specifies a change in the position of the vehicle 1 on the basis of a temporal change in the feature points extracted from the peripheral images captured during teacher driving. The route recording unit 104 may correct, on the basis of the acquired vehicle information, the position of the vehicle 1 specified from the feature points.

In the present embodiment, the travel route 80 for autonomous driving and the speed, steering angle, braking operation of the vehicle 1 traveling on the travel route 80, and information in which feature points extracted from the peripheral images captured in accordance with the movement of the vehicle 1 during teacher driving are associated in time series are referred to as travel route information. The route recording unit 104 stores the travel route information in the storage unit 111. The travel route information is used by the vehicle control unit 110 during autonomous driving as described later. Note that the technique for recording the travel route 80 and the definition of the travel route information are not limited to this example.

In addition, the route recording unit 104 defines the environment around the vehicle 1 as a map on the basis of the feature points extracted from the peripheral images captured during the teacher driving, and stores the map in the storage unit 111. Note that the recording processing of the travel route 80 based on the teacher driving may be referred to as learning processing.

The route image generation unit 105 generates a travel route image representing the travel route 80 recorded by the route recording unit 104.

Figure 6:
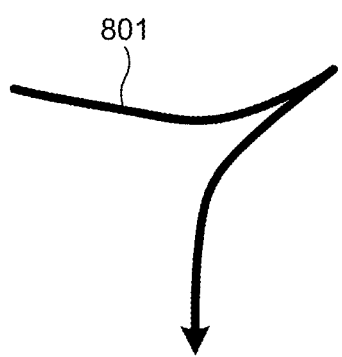
FIG. 6 is a diagram illustrating an example of a travel route image according to the first embodiment.

FIG. 6 is a diagram illustrating an example of a travel route image 801 according to the first embodiment. As illustrated in FIG. 6, the travel route image 801 is an image in which the route from the start position to the end position of the travel route 80 is indicated by a line. In the travel route image 801, the travel route 80 is represented by, for example, the movement trajectory taking the center of the vehicle body 12 of the vehicle 1 as a reference. Moreover, in the example illustrated in FIG. 6, the leading end of the line of the travel route image 801 is formed by an arrow indicating the direction of travel of the vehicle 1. But the mode of the travel route image 801 is not limited thereto.

In addition, the route image generation unit 105 generates an outline image representing the movement trajectory of the outline of the vehicle body 12 of the vehicle 1 in teacher driving.

Figure 7:
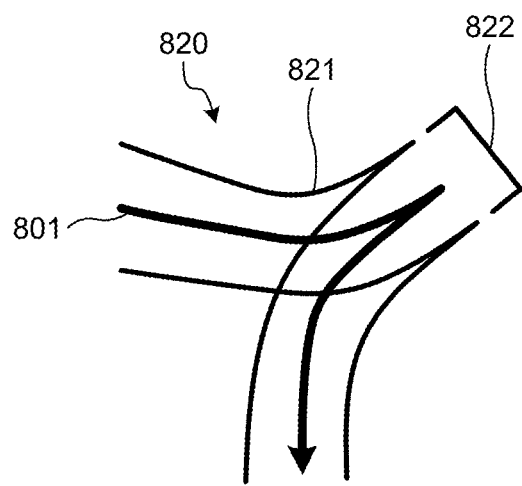
FIG. 7 is a diagram illustrating an example of an outline image according to the first embodiment.

FIG. 7 is a diagram illustrating an example of an outline image 820 according to the first embodiment. Note that, in FIG. 7, a travel route image 801 is also illustrated together with the outline image 820. For example, as illustrated in FIG. 7, the outline image 820 represents the movement trajectory of the outline of the vehicle body 12 of the vehicle 1 when the vehicle 1 travels on the travel route 80. The route image generation unit 105 estimates the movement trajectory of the outline of the vehicle body 12 on the basis of, for example, the recorded travel route 80 and the size of the vehicle body 12. Note that the size of the vehicle body 12 is stored in the storage unit 111, for example.

The outline image 820 according to the present embodiment includes at least a vehicle width image 821 indicating the movement trajectory of the two left and right end portions of the vehicle body 12 of the vehicle 1. In addition, in a case where the travel route 80 includes a K-turn, the outline image includes an end portion image 822 indicating the position of the front end portion or the rear end portion of the vehicle body 12 of the vehicle 1 at the K-turn point.

Returning to FIG. 5, the enlarged overhead image generation unit 106 generates an enlarged overhead image which is obtained by looking at the travel route 80 and the display target range covering the periphery of the travel route 80 from above, on the basis of the peripheral image. The display target range is, for example, a range from the start position 900 to the end position of the travel route 80 in the teacher driving. The enlarged overhead image is an example of a first enlarged overhead image according to the present embodiment. This processing is an example of a first enlarged overhead image generation step.

Figure 8:
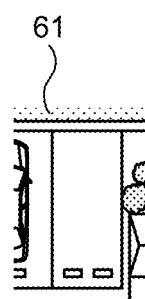
FIG. 8 is a diagram illustrating an example of an overhead image according to the first embodiment.

FIG. 8 is a diagram illustrating an example of an overhead image 61 according to the first embodiment. The enlarged overhead image generation unit 106 generates an overhead image 61 around the vehicle 1 for each of the positions on the travel route 80 by converting peripheral images captured in time series by the imaging devices 16a to 16c in positions on the travel route 80 into images viewed from a virtual viewpoint and then synthesizing those images. Such image processing of viewpoint transformation and synthesis is an example of an overhead image generation step.

The virtual viewpoint is located, for example, directly above the vehicle 1. For this reason, an overhead image is also referred to as a top view. A known technique can be adopted as the method for generating the overhead image 61.

The overhead image 61 illustrated in FIG. 8 is a composite image that is generated on the basis of the peripheral images captured by the imaging devices 16a to 16c when the vehicle 1 is located in the parking space 910 which is the end point of the travel route 80. The respective imaging ranges of the imaging devices 16a to 16c change with the movement of the vehicle 1. Thus, the overhead images 61 differ from each other when the vehicle 1 is at different positions on the travel route 80.

Moreover, the enlarged overhead image generation unit 106 synthesizes the overhead images 61 in accordance with temporal changes in the times of capturing the peripheral images corresponding to the respective overhead images 61, thereby generating an image depicting the periphery of the vehicle 1 over the entire travel route 80. Such an image is referred to as an enlarged overhead image in the present embodiment because a wider range than that of the individual overhead images 61 is to be depicted. Note that an enlarged overhead image may also be simply referred to as an overhead image.

Figure 9:
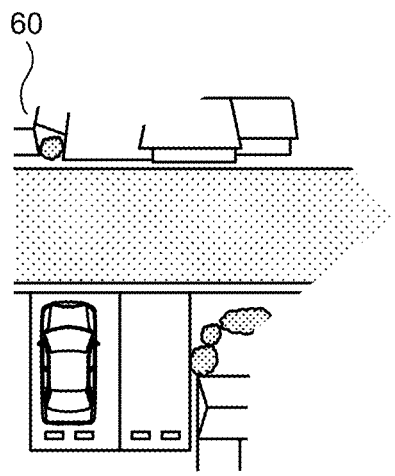
FIG. 9 is a diagram illustrating an example of an enlarged overhead image according to the first embodiment.

FIG. 9 is a diagram illustrating an example of an enlarged overhead image 60 according to the first embodiment. For example, the enlarged overhead image generation unit 106 generates one enlarged overhead image 60 by connecting the overhead images 61 on the basis of feature points included in those overhead images 61. The enlarged overhead image 60 includes a road surface or the ground on which the vehicle 1 travels, and a background that depicts the periphery of the travel route 80 from the start position 900 of the travel route 80 to the parking space 910 that is the end position.

Note that, in FIGS. 8 and 9, the description has been provided by assuming that the enlarged overhead image generation unit 106 generates the overhead images 61 from the peripheral images and then generates the enlarged overhead image 60 from the overhead images 61, but the flow of the generation processing is not limited to this processing. For example, the enlarged overhead image generation unit 106 may also generate the enlarged overhead image 60 from the peripheral images.

Returning to FIG. 5, the display control unit 107 superimposes the travel route image 801 onto the enlarged overhead image 60 and causes the display device 120 to display the resulting image. Hereinafter, the enlarged overhead image 60 on which the travel route image 801 is superimposed is referred to as the overhead route image. Note that the display processing is an example of the first display step according to the present embodiment.

Figure 10:
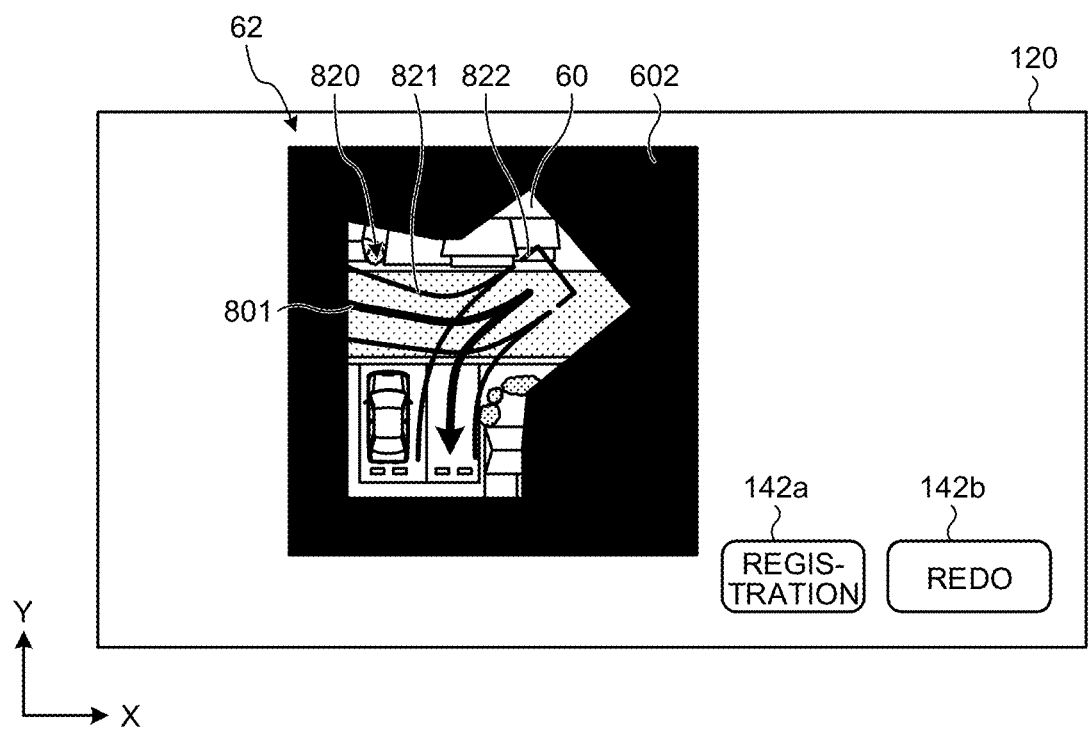
FIG. 10 is a diagram illustrating an example of an overhead route image according to the first embodiment.

FIG. 10 is a diagram illustrating an example of an overhead route image 62 according to the first embodiment. In the overhead route image 62 illustrated in FIG. 10, a travel route image 801 and an outline image 820 are superimposed onto the enlarged overhead image 60. Note that the outline image 820 is not essential, and at least the travel route image 801 may be displayed and superimposed on the enlarged overhead image 60.

In the example illustrated in FIG. 10, the display control unit 107 displays a rectangular background region 602 as the background of the enlarged overhead image 60. Note that the enlarged overhead image 60 may include the background region 602. Note that, although the background region 602 is displayed in black in FIG. 10, this is an example, and there are no particular limitations on the display mode.

The display timing for the overhead route image 62 is, for example, when an operation to end teacher driving is executed by the user. Upon receiving an operation by the reception unit 101 to end the recording of teacher driving, the display control unit 107 causes the display device 120 to display the overhead route image 62.

For example, depicted in the overhead route image 62 together with the travel route image 801 and the outline image 820 are: the road 40, the trees 73a and 73b, which are obstacles in the vicinity of the travel route 80, the other residence 71a, the other parking spaces 711a and 711c, and the other vehicle 30a, and the like. Therefore, the user is able to check the positional relationship between the vehicle 1 and peripheral obstacles and the road during teacher driving.

Further, the display control unit 107 causes the display device 120 to display the overhead route image 62 at an angle at which the front direction of the vehicle 1 at the end of the teacher driving is directed in the vertical direction of the display device 120. In the example illustrated in FIG. 10, the vertical direction of the display device 120 is the Y direction, and the horizontal direction is the X direction. The vertical direction is also referred to as the top of the screen. Note that the front direction of the vehicle 1 means the direction in which the front end portion of the vehicle 1 is facing.

As illustrated in FIG. 4, in the present embodiment, the vehicle 1 moves forward and then moves backward to enter the parking space 910 during teacher driving. Therefore, the front side of the vehicle 1 at the end of teacher driving faces the entrance side of the parking space 910, and the driver also faces the entrance side of the parking space 910. That is, the display control unit 107 causes the display device 120 to display the overhead route image 62 such that the front direction of the vehicle 1 at the end of teacher driving faces the Y direction, and thus the direction in which the driver actually sees the landscape outside the vehicle 1 at the end of teacher driving matches the direction of the overhead route image 62 displayed by the display device 120. Therefore, the driver can easily understand the relationship between the travel route 80 and the actual peripheral environment.

In addition, the display control unit 107 causes the display device 120 to display a registration button 142a and a redo button 142b together with the overhead route image 62. The registration button 142a is an image button that receives a user operation to give an instruction on registration of the travel route 80 corresponding to the overhead route image 62. In addition, the redo button 142b is an image button for receiving a user operation giving an instruction to not register the travel route 80 corresponding to the overhead route image 62. When the registration button 142a and the redo button 142b are pressed, the reception unit 101 receives an operation corresponding to each button. Note that the method for receiving an operation to register or delete the travel route 80 is not limited to the foregoing.

Returning to FIG. 5, the registration processing unit 108 registers, in the storage unit 111, the travel route 80 generated by the route recording unit 104. In the present embodiment, the registration processing unit 108 registers only the travel route 80 selected by the user as the travel route 80 for autonomous driving. For example, when the user presses the registration button 142a, which is displayed together with the overhead route image 62, the overhead route image 62 registers the travel route 80 corresponding to the overhead route image 62 as the travel route 80 for autonomous driving. For example, when the user presses the redo button 142b, which is displayed together with the overhead route image 62, the overhead route image 62 deletes the travel route 80 corresponding to the overhead route image 62.

When the vehicle 1 travels autonomously on the basis of the travel route 80 due to the vehicle control unit 110 as described later, the estimation unit 109 estimates the position and direction of the vehicle 1 on the basis of the peripheral images.

For example, the estimation unit 109 estimates the position of the vehicle 1 by comparing the feature points of the peripheral images captured during the teacher driving with the feature points of the current peripheral images. Note that the technique for estimating the position and the direction of the vehicle 1 by the estimation unit 109 is not limited to this example.

The vehicle control unit 110 moves the vehicle 1 to the parking space 910 by autonomous driving on the basis of the travel route 80. The vehicle control unit 110 causes the vehicle 1 to travel autonomously along the registered travel route 80 by controlling the steering, braking, and acceleration/deceleration of the vehicle 1. Such a travel control technique is also called regenerating the travel route 80. The autonomous driving processing by the vehicle control unit 110 is an example of a travel control step.

Moreover, the vehicle control unit 110 may cause the vehicle 1 to perform an operation different from the teacher driving on the basis of the vehicle information and the environment information of the vehicle 1, which are acquired by the acquisition unit 102 during autonomous driving. Environmental information includes the presence or absence of obstacles around the vehicle 1 and the distance between the vehicle 1 and the obstacles around the vehicle 1, as described above. For example, when an obstacle such as another vehicle approaches during autonomous driving, the vehicle control unit 110 executes control such as stopping the vehicle 1.

Note that, during autonomous driving by the vehicle control unit 110, the driver may be seated on the driving seat 130a of the vehicle 1 or may get out of the vehicle 1.

In addition, the vehicle control unit 110 may move the vehicle 1 so as to return to the travel route 80 by feedback control when the vehicle 1 deviates from the travel route 80 during autonomous driving. For example, the vehicle control unit 110 specifies the difference between the position of the vehicle 1 estimated by the estimation unit 109 and the travel route 80, and causes the vehicle 1 to travel so as to reduce the difference.

While FIG. 5 illustrates that the parking assist device 100 is provided with the vehicle control unit 110, the vehicle control unit 110 may be implemented by another ECU different from the parking assist device 100.

Next, the flow of the parking assist processing which is executed by the parking assist device 100 according to the present embodiment, which is configured as described above, will be described.

Figure 11:
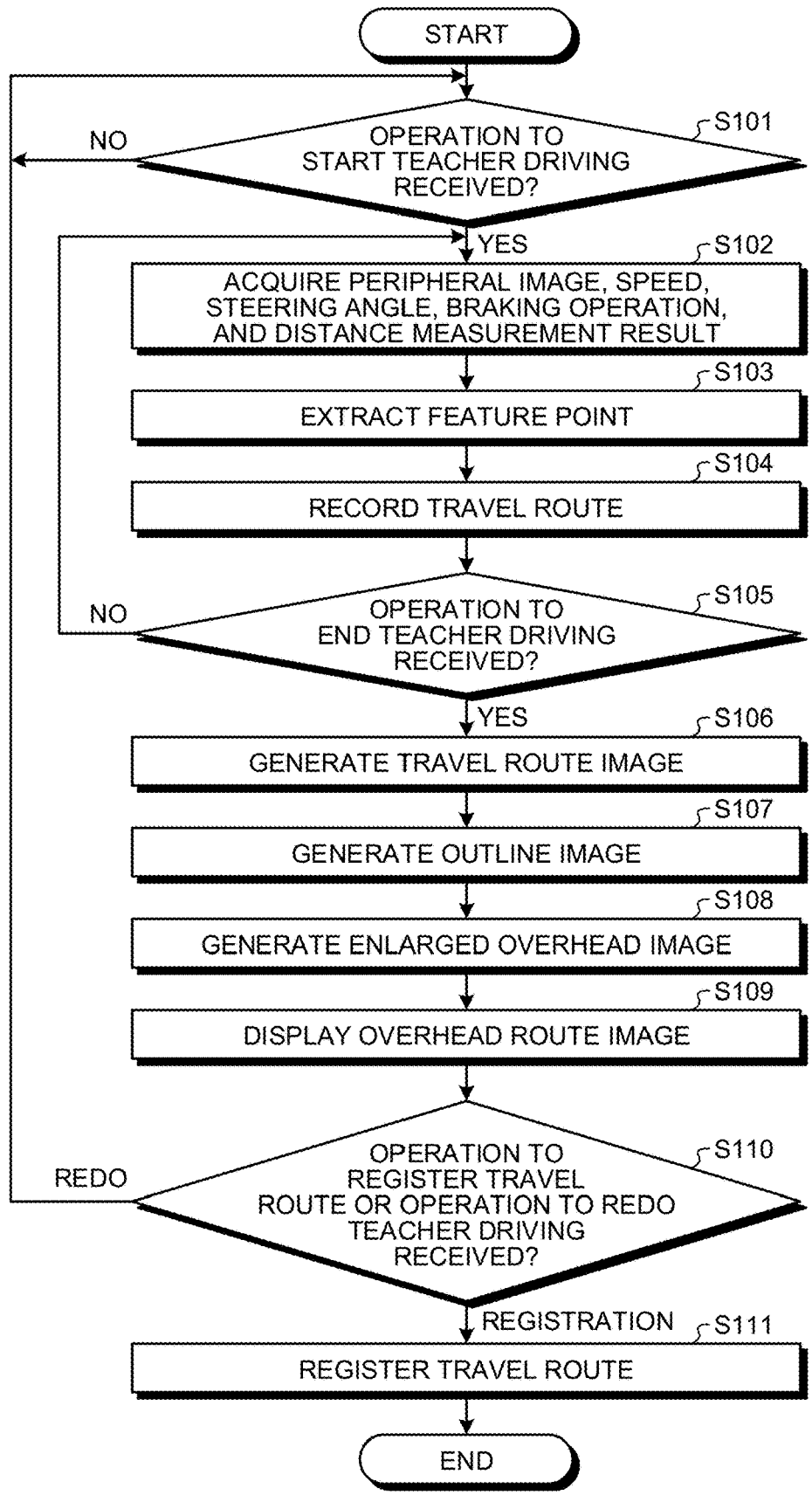
FIG. 11 is a flowchart illustrating 11 an example of the flow of travel route recording processing, which is executed by the parking assist device according to the first embodiment.

FIG. 11 is a flowchart illustrating an example of the flow of travel route recording processing executed by the parking assist device 100 according to the first embodiment. First, the reception unit 101 determines whether or not an operation by the user to start teacher driving has been received (S101). When the operation by the user to start teacher driving has not been received (S101 "No"), the reception unit 101 repeats the processing of S101 and stands by.

In response to determining that the reception unit 101 receives the operation by the user to start teacher driving (S101 "Yes"), the processing to record the teacher driving starts. After the operation to start the teacher driving, the driver manually causes the vehicle 1 to travel so as to move to the parking space 910.

Then, during teacher driving by the driver, the acquisition unit 102 acquires peripheral images from the imaging devices 16a to 16c. In addition, the acquisition unit 102 acquires the speed, the steering angle, and the braking operation of the vehicle 1 from various sensors or other ECUs of the vehicle 1. Moreover, the acquisition unit 102 acquires, from the transceivers 15, a measurement result as to the distance between the vehicle 1 and peripheral obstacles (S102).

The extraction unit 103 extracts feature points from the acquired peripheral images (S103).

The route recording unit 104 then estimates the position of the vehicle 1 during teacher driving on the basis of changes in feature points extracted from the peripheral images, and the speed, the steering angle, the braking operation, and the distance measurement result, and records, as the travel route 80, temporal changes in the position (S104).

The reception unit 101 then determines whether or not an operation by the user to end teacher driving has been received (S105). When the operation by the user to end teacher driving has not been received (S105 "No"), the reception unit 101 repeats the processing of S102 to S105.

In response to determining that the reception unit 101 receives the operation by the user to end teacher driving (S105 "Yes"), the route image generation unit 105 generates the travel route image 801 on the basis of the travel route 80 recorded by the route recording unit 104 (S106).

In addition, the route image generation unit 105 generates the outline image 820 representing the movement trajectory of the outline of the vehicle body 12 of the vehicle 1 in teacher driving (S107).

In addition, the enlarged overhead image generation unit 106 generates the enlarged overhead image 60 on the basis of the peripheral images captured in time series by the imaging devices 16*a* to 16*c* (S108).

Next, the display control unit 107 causes the display device 120 to display the overhead route image 62, which is obtained by superimposing the travel route image 801 and the outline image 820 onto the enlarged overhead image 60 (S109). In addition, the display control unit 107 causes the display device 120 to display the registration button 142*a* and the redo button 142*b*, as illustrated in FIG. 10.

After that, when the reception unit 101 receives an operation by the user to redo teacher driving (S110 "re-do"), the processing returns to S101. Moreover, when the reception unit 101 receives an operation by the user to register the teacher driving ("registration" in S110), the registration processing unit 108 registers the travel route 80 in the storage unit 111 as the travel route 80 for autonomous driving (S111). At this point, the processing of this flowchart is completed.

As described above, in the parking assist method executed by the parking assist device 100 of the present embodiment, captured images, which are obtained by imaging the periphery of the vehicle 1 in time series according to the movement of the vehicle 1 during teacher driving, are acquired from the imaging devices 16 installed in the vehicle 1, and the travel route 80 of the vehicle 1 during teacher driving is recorded. In the parking assist method, the enlarged overhead image 60 viewing a display target range from above is generated on the basis of the captured images. The display target range covers the travel route 80 and the periphery of the travel route 80. Then, the display device 120 is caused to display the generated enlarged overhead image 60. Therefore, with the parking assist method and the parking assist device 100 of the present embodiment, the user is able to easily understand the positional relationship between the travel route 80 of the vehicle 1 based on teacher driving, and objects around the vehicle 1 and the road 40. Moreover, in the parking assist device 100 according to the present embodiment, the overhead route image 62 obtained by superimposing the travel route image 801 onto the enlarged overhead image 60 is displayed by the display device 120, thereby making it easier for the user to understand the positional relationship between the travel route 80 of the vehicle 1 based on teacher driving, and objects around the vehicle 1, and the road 40.

In a normal overhead image as a comparative example, the current state around the vehicle is imaged in a viewpoint from above. However, the range spanning the whole travel route and a region obtained through enlargement up to the periphery thereof are not imaged. Therefore, although a normal overhead image is appropriate for the driver to check in real time, it may not be sufficient to check the entire travel route. On the other hand, in the parking assist method executed by the parking assist device 100 of the present embodiment, the user is able to objectively understand the entire travel route 80 and the state of the periphery thereof in teacher driving.

Moreover, in the parking assist method executed by the parking assist device 100 of the present embodiment, the outline image 820 representing the movement trajectory of the outline of the vehicle body 12 of the vehicle 1 in teacher driving is displayed and superimposed on the enlarged overhead image 60. Therefore, with the parking assist method executed by the parking assist device 100 of the present embodiment, the driver is able to easily understand the positional relationship and the distance between the outline of the vehicle body 12 of the vehicle 1 and peripheral obstacles, and the like. For example, even when the vehicle 1 reaches the parking space without making contact with peripheral obstacles in teacher driving, the distance between the outline of the vehicle body 12 and the peripheral obstacles, and the like, may be close. By visually recognizing the outline image 820 on the enlarged overhead image 60, the user is able to check the distance between the outline of the vehicle body 12 and the peripheral obstacles, and the like, from an upper viewpoint.

For example, in the example illustrated in FIG. 10, the outline image 820 of the vehicle 1 in teacher driving is also depicted in a region corresponding to the corner space 722 illustrated in FIG. 4. Therefore, it is clear that, although the center of the vehicle 1 does not pass through the corner space 722 in teacher driving, the vehicle body 12 of the vehicle 1 passes through the corner space 722. For example, it is assumed that nothing is placed in the corner space 722 during teacher driving, and that the corner space 722 is sometimes used as a bicycle parking space. In this case, the user checks the movement trajectory of the vehicle body 12 of the vehicle 1 by using the outline image 820 on the overhead route image 62, making it possible to avoid adopting, for autonomous driving, the travel route 80 passing through the corner space 722.

Moreover, in the parking assist method executed by the parking assist device 100 according to the present embodiment, the overhead route image 62 is displayed upon receipt of operations by the user to start and end the recording of the teacher driving. Therefore, with the parking assist method executed by the parking assist device 100 according to the present embodiment, the user is able to immediately check, by the overhead route image 62, the positional relationship between the vehicle 1 and the peripheral obstacles, and the road in teacher driving, after the end of teacher driving. In addition, by facilitating this checking, it is possible to support decision-making by the user regarding whether to register the travel route based on the teacher driving or to redo the teacher driving, after the end of the teacher driving.

Moreover, in the parking assist method executed by the parking assist device 100 of the present embodiment, the overhead route image 62 is displayed by the display device 120 at an angle at which the front direction of the vehicle 1 at the end of the teacher driving is oriented toward the top of the screen of the display device 120. With such a configuration, the direction in which the driver actually views the scenery outside the vehicle 1 at the end of teacher driving matches the direction of the overhead route image 62 displayed by the display device 120. Therefore, the driver can easily understand the relationship between the travel route 80 and the actual peripheral environment.

Second Embodiment

In the above-described first embodiment, the parking assist device 100 displays the travel route image 801 and the outline image 820 by superimposing them onto the enlarged overhead image 60. In the second embodiment, the parking assist device 100 changes the display mode of the outline image 820 in accordance with the distance to an obstacle around the vehicle 1.

The vehicle 1 according to the present embodiment has the same configuration as that of the first embodiment described with reference to FIGS. 1 and 2. The hardware configuration of the parking assist device 100 according to the present embodiment is the same as that of the first embodiment illustrated in FIG. 3.

As in the first embodiment, the parking assist device 100 of the present embodiment includes a reception unit 101, an acquisition unit 102, an extraction unit 103, a route recording unit 104, a route image generation unit 105, an enlarged overhead image generation unit 106, a display control unit 107, a registration processing unit 108, an estimation unit 109, a vehicle control unit 110, and a storage unit 111. The reception unit 101, the acquisition unit 102, the extraction unit 103, the route recording unit 104, the enlarged overhead image generation unit 106, the display control unit 107, the registration processing unit 108, the estimation unit 109, the vehicle control unit 110, and the storage unit 111 have functions similar to those of the first embodiment.

The route image generation unit 105 of the present embodiment has functions similar to those of the first embodiment, and generates a mode of an area, of the outline image, where the distance between objects around the vehicle 1 and the vehicle 1 during teacher driving is equal to or less than a threshold value, in a mode different from an area where the distance is more than the threshold value. The value of the threshold value for the distance between objects around the vehicle 1 and the vehicle 1 is not particularly limited, but may be, for example, 50 cm or the like. Note that the threshold value may be a preset fixed value or may be changeable by the user.

Figure 12:
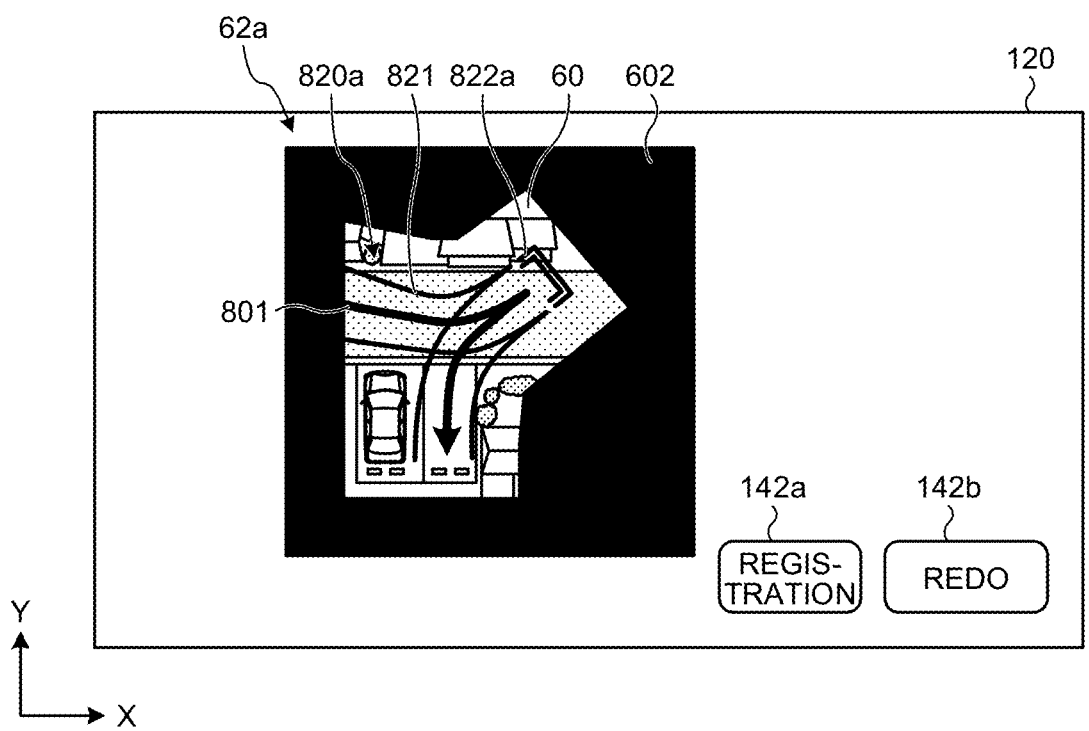
FIG. 12 is a diagram illustrating an example of an overhead route image according to a second embodiment.

FIG. 12 is a diagram illustrating an example of an overhead route image 62a according to the second embodiment. In the example illustrated in FIG. 12, in the K-turn position of the vehicle 1 on the travel route 80, the distance between peripheral obstacles and the vehicle 1 is equal to or less than the threshold value.

The route image generation unit 105 generates an outline image 820a with, for example, a solid line on an area where the distance between objects around the vehicle 1 and the vehicle 1 is more than the threshold value, and a double line on an area where the distance between objects around the vehicle 1 and the vehicle 1 is less than or equal to the threshold value. In the example illustrated in FIG. 12, the route image generation unit 105 applies a double line to an end portion image 822a corresponding to the area where the distance between peripheral obstacles and the vehicle 1 is equal to or less than the threshold value, and applies a solid line to the vehicle width image 821 corresponding to the area where the distance is more than the threshold value.

Then, the display control unit 107 of the present embodiment has functions similar to those of the first embodiment, and superimposes and displays the end portion image 822a and the vehicle width image 821, which have been generated by the route image generation unit 105, onto the enlarged overhead image 60, thereby displaying the area, in the outline image 820, where the distance to peripheral obstacles is equal to or less than a threshold value, in a display mode different from a display mode applied to an area where the distance is more than the threshold value.

Note that the display mode is not limited to or by the example illustrated in FIG. 12, and that the route image generation unit 105 may set the color of the area where the distance between objects around the vehicle 1 and the vehicle 1 is equal to or less than a threshold value to a color different from that of other sections, or may add a warning notice mark or message.

As described above, in the parking assist method executed by the parking assist device 100 of the present embodiment, the area, in the outline image 820, where the distance to a peripheral obstacle is equal to or less than a threshold value is displayed in a mode different from the area where the distance is more than the threshold value. Therefore, with the parking assist method executed by the parking assist device 100 according to the present embodiment, it is possible to allow the user to understand the area where the distance between the vehicle 1 and a peripheral obstacle is close in teacher driving, and it is thus possible to support decision-making by the user regarding whether to register the travel route based on the teacher driving or to redo the teacher driving, after the end of the teacher driving.

Third Embodiment

In the third embodiment, the parking assist device 100 further displays, on an overhead route image, a vehicle image representing the vehicle 1.

The vehicle 1 according to the present embodiment has the same configuration as that of the first embodiment described with reference to FIGS. 1 and 2. The hardware configuration of the parking assist device 100 according to the present embodiment is the same as that of the first embodiment illustrated in FIG. 3.

As in the first embodiment, the parking assist device 100 of the present embodiment includes a reception unit 101, an acquisition unit 102, an extraction unit 103, a route recording unit 104, a route image generation unit 105, an enlarged overhead image generation unit 106, a display control unit 107, a registration processing unit 108, an estimation unit 109, a vehicle control unit 110, and a storage unit 111. The reception unit 101, the acquisition unit 102, the extraction unit 103, the route recording unit 104, the route image generation unit 105, the enlarged overhead image generation unit 106, the registration processing unit 108, the estimation unit 109, the vehicle control unit 110, and the storage unit 111 have functions similar to those of the first embodiment.

The display control unit 107 according to the present embodiment has functions similar to those of the first embodiment, and serves to display a vehicle image representing the vehicle 1 at the position in the overhead route image where the vehicle 1 is present at the time of the end of teacher driving. The vehicle image is, for example, a computer graphics (CG) image imitating the shape of the vehicle 1. It is assumed that the vehicle image is pre-stored in the storage unit 111, for example.

Figure 13:
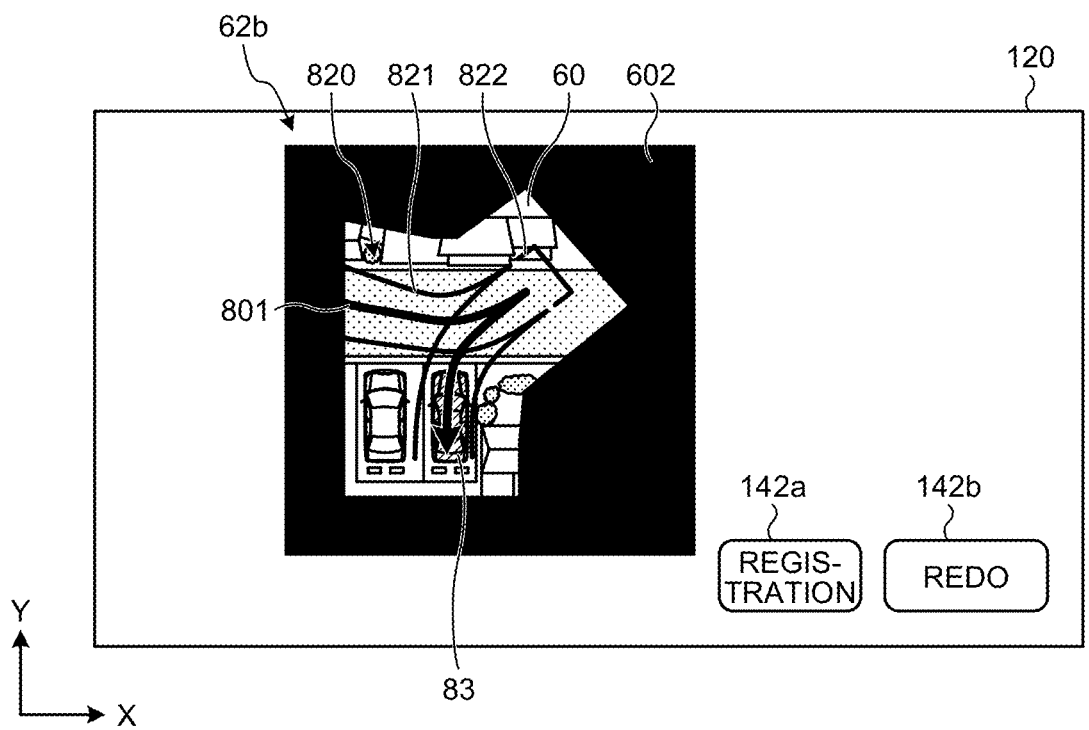
FIG. 13 is a diagram illustrating an example of an overhead route image according to a third embodiment.

FIG. 13 is a diagram illustrating an example of an overhead route image 62b according to a third embodiment.

As illustrated in FIG. 13, the display control unit 107 of the present embodiment superimposes and displays a vehicle image 83 in a position corresponding to the parking space 910 onto the enlarged overhead image 60. In addition, the direction of the vehicle image 83 is the direction of the vehicle 1 at the time of the end of teacher driving.

In the present embodiment, the position of the vehicle 1 at the time of the end of teacher driving is the parking space 910. When, for example, the driver checks the overhead route image 62b while still riding in the vehicle 1 after the end of teacher driving, the position of the vehicle 1, in which the driver is riding, is displayed on the overhead route image 62b, and hence the driver is able to easily understand the positional relationship between the position of the vehicle 1 and the travel route 80.

Fourth Embodiment

In the above-described first embodiment, the parking assist device 100 receives a user operation to register or delete the travel route 80 obtained through teacher driving, for each instance of teacher driving. In the fourth embodiment, the parking assist device 100 registers the travel route 80 selected by the user from among the travel routes 80 obtained through plural times of teacher driving after completing all the teacher driving.

The vehicle 1 according to the present embodiment has the same configuration as that of the first embodiment described with reference to FIGS. 1 and 2. The hardware configuration of the parking assist device 100 according to the present embodiment is the same as that of the first embodiment illustrated in FIG. 3.

As in the first embodiment, the parking assist device 100 of the present embodiment includes a reception unit 101, an acquisition unit 102, an extraction unit 103, a route recording unit 104, a route image generation unit 105, an enlarged overhead image generation unit 106, a display control unit 107, a registration processing unit 108, an estimation unit 109, a vehicle control unit 110, and a storage unit 111. The acquisition unit 102, the extraction unit 103, the route recording unit 104, the route image generation unit 105, the enlarged overhead image generation unit 106, the estimation unit 109, the vehicle control unit 110, and the storage unit 111 have functions similar to those of the first embodiment.

The display control unit 107 according to the present embodiment has functions similar to those of the first embodiment, and causes the display device 120 to display overhead route images based on plural times of teacher driving after completing all the teacher driving. The display processing is an example of a second display step in the present embodiment.

Figure 14:
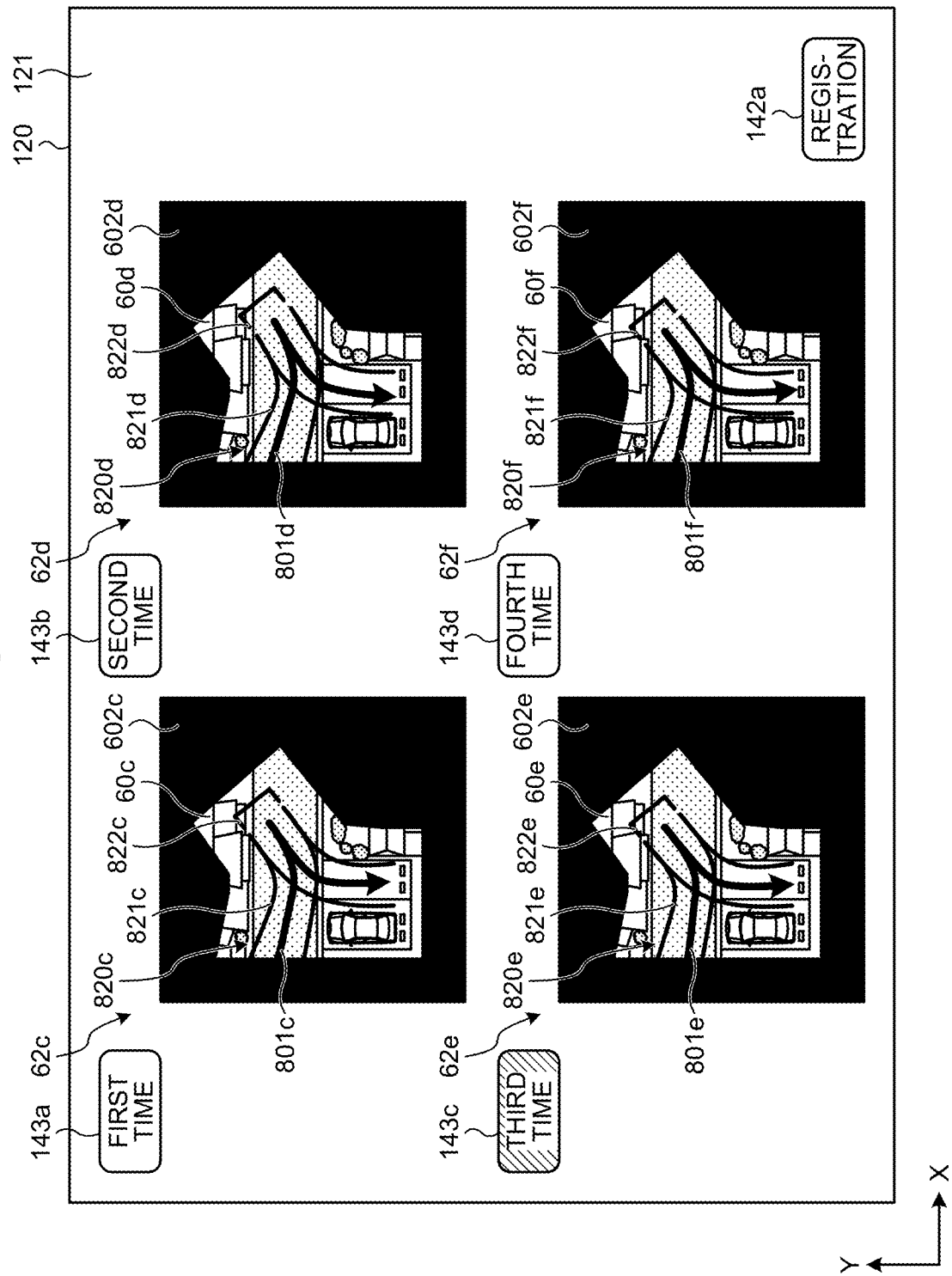
FIG. 14 is a diagram illustrating an example of a travel route selection screen according to a fourth embodiment.

FIG. 14 is a diagram illustrating an example of a travel route selection screen 121 according to a fourth embodiment. The display control unit 107 causes the display device 120 to display the travel route selection screen 121 that includes overhead route images 62c to 62f. Each of the overhead route images 62c to 62f corresponds to the first to fourth teacher driving. Note that the respective numbers of teacher driving and overhead route images 62 illustrated in FIG. 14 is an example, and the present invention is not limited to four.

Each of the overhead route images 62c to 62f is an image that is obtained by superimposing travel route images 801c to 801f and outline images 820c to 820f onto enlarged overhead images 60c to 60f. The outline images 820c to 820f include vehicle width images 821c to 821f and end portion images 822c to 822f.

In addition, the display control unit 107 displays selection buttons 143a to 143d and a registration button 142a, with which the user is able to select each of the overhead route images 62c to 62f, on the travel route selection screen 121. The selection buttons 143a to 143d correspond to the overhead route images 62c to 62f on a one-to-one basis.

The reception unit 101 of the present embodiment has functions similar to those of the first embodiment, and receives a user operation to select one overhead route image 62 corresponding to the travel route 80 to be registered from among the overhead route images 62c to 62f. The reception processing is an example of a selection reception step in the present embodiment.

For example, the user selects one overhead route image 62 corresponding to the travel route 80 to be registered by pressing any one of the selection buttons 143a to 143d and then pressing the registration button 142a. In the example illustrated in FIG. 14, the user selects a selection button 143c that corresponds to the third teacher driving. When the user presses the registration button 142a in this state, the reception unit 101 receives a user operation to register the travel route 80 obtained in the third teacher driving as the travel route 80 for autonomous driving.

The registration processing unit 108 of the present embodiment has functions similar to those of the first embodiment, and registers the travel route 80 selected by the user in the storage unit 111 as the travel route 80 for autonomous driving.

Figure 15:
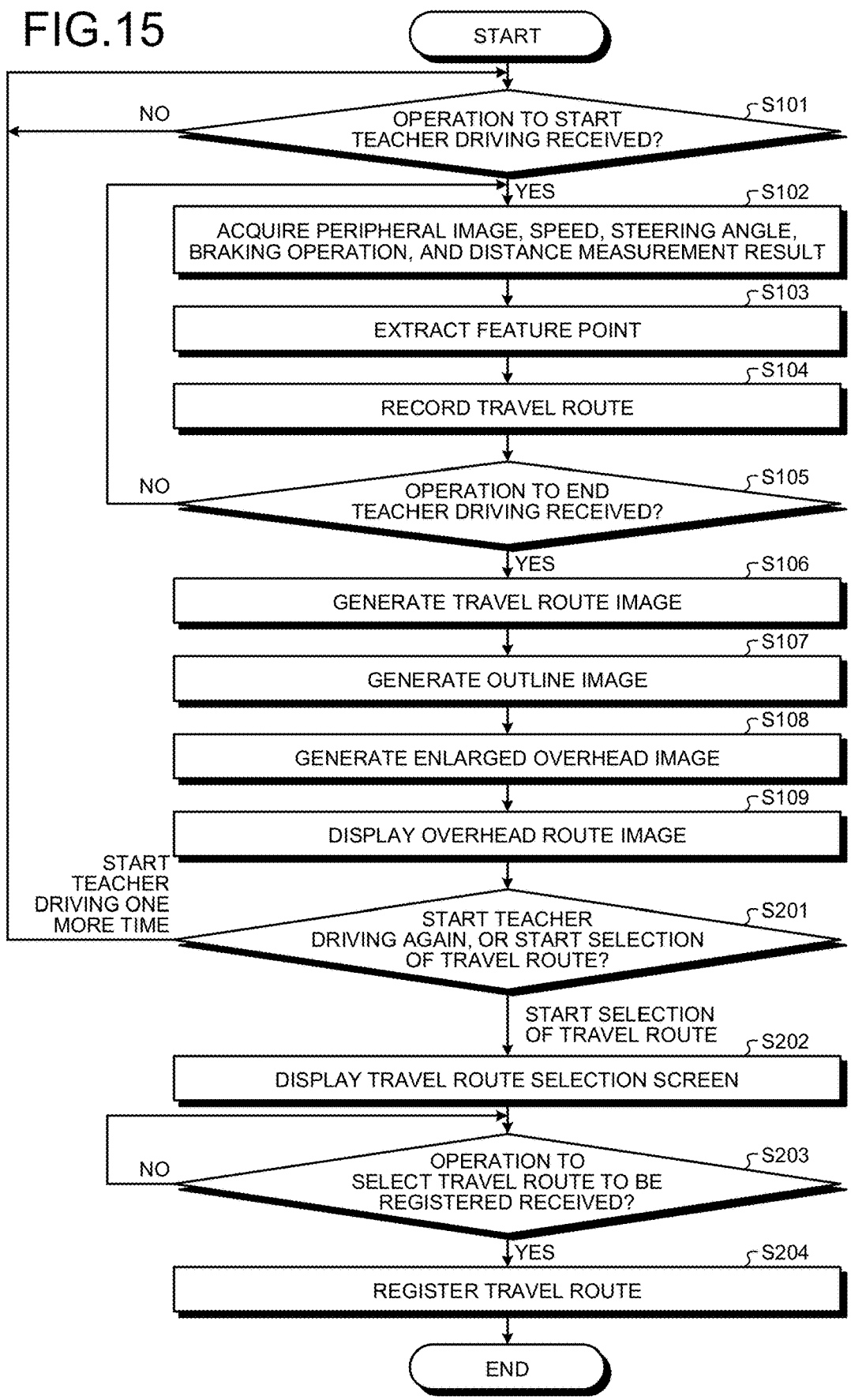
FIG. 15 is a flowchart illustrating an example of the flow of travel route recording processing executed by the parking assist device according to the fourth embodiment.

FIG. 15 is a flowchart illustrating an example of the flow of travel route recording processing which is executed by the parking assist device 100 according to the fourth embodiment.

The processing extending from the processing to determine whether or not an operation to start teacher driving is received in S101, to the displaying of the overhead route image 62 for each teacher driving in S109, is similar to the processing of the first embodiment.

Then, when the reception unit 101 receives, after S109, an operation by the user to start teacher driving again (S201 "Start teacher driving again"), the processing returns to S101. In this case, the driver drives the vehicle 1 to go out of the parking space 910 and moves the vehicle 1 to the start position 900.

When the reception unit 101 receives an operation by the user to start the selection of the travel route 80 (S201 "start travel route selection"), the display control unit 107 causes the display device 120 to display the travel route selection screen 121 (S202).

The reception unit 101 then determines whether an operation by the user to select the travel route 80 to be registered has been received (S203). When the reception unit 101 does not receive the operation by the user to select the travel route 80 to be registered (S203 "No"), the display control unit 107 continues the display of the travel route selection screen 121.

In response to determining that the reception unit 101 receives the operation by the user to select the travel route 80 to be registered, the registration processing unit 108 registers the travel route 80 selected by the user in the storage unit 111 as the travel route 80 for autonomous driving (S204). At this point, the processing of this flowchart is completed.

As described above, in the parking assist method executed by the parking assist device 100 according to the present embodiment, after execution of plural times of teacher driving, the overhead route images 62c to 62f based on the plural times of teacher driving are displayed by the display device 120. Then, a user operation is received, which is to select the overhead route image 62 corresponding to the travel route 80 to be registered from among the overhead route images 62c to 62f. Therefore, with the parking assist method executed by the parking assist device 100 of the present embodiment, the user is able to compare the travel routes 80 obtained through the plural times of teacher driving and select a desired travel route 80 as a registration target.

Fifth Embodiment

In the above-described first to fourth embodiments, the displaying of the overhead route images 62, 62a to 62f after teacher driving has been described. On the other hand, in the fifth embodiment, the displaying of the overhead route images during autonomous driving will be described.

The vehicle 1 according to the present embodiment has the same configuration as that of the first embodiment described with reference to FIGS. 1 and 2. The hardware configuration of the parking assist device 100 according to the present embodiment is the same as that of the first embodiment illustrated in FIG. 3.

As in the first embodiment, the parking assist device 100 of the present embodiment includes a reception unit 101, an acquisition unit 102, an extraction unit 103, a route recording unit 104, a route image generation unit 105, an enlarged overhead image generation unit 106, a display control unit 107, a registration processing unit 108, an estimation unit 109, a vehicle control unit 110, and a storage unit 111. The reception unit 101, the route recording unit 104, the route image generation unit 105, the registration processing unit 108, the estimation unit 109, the vehicle control unit 110, and the storage unit 111 have functions similar to those of the first embodiment.

The acquisition unit 102 of the present embodiment has functions similar to those of the first embodiment, and acquires, from the imaging devices 16a to 16c, peripheral images, namely, captured images obtained by imaging the periphery of the vehicle 1 in time series according to the movement of the vehicle 1 during autonomous driving. The acquisition processing during autonomous driving is an example of the second acquisition step in the present embodiment.

The extraction unit 103 of the present embodiment has functions similar to those of the first embodiment, and extracts feature points from peripheral images acquired during autonomous driving.

The enlarged overhead image generation unit 106 of the present embodiment has functions similar to those of the first embodiment, and generates an overhead image 61 from the peripheral images acquired during autonomous driving.

In addition, the enlarged overhead image generation unit 106 synthesizes the overhead image 61 based on the peripheral images captured during autonomous driving, with the enlarged overhead image 60 during teacher driving which is stored in the storage unit 111, thereby updating the enlarged overhead image 60 as the vehicle 1 advances during autonomous driving. The synthesis processing is an example of a synthesis step.

For example, on the basis of the feature points extracted by the extraction unit 103, the enlarged overhead image generation unit 106 specifies an image range on the enlarged overhead image 60 of teacher driving, which corresponds to the overhead image 61 based on the peripheral images captured during autonomous driving, and replaces the specified image range with the overhead image 61. By repeating this processing, the range imaged by the imaging device 16 is sequentially replaced as the vehicle 1 advances, in the enlarged overhead image 60 during teacher driving. Note that the technique for synthesizing the enlarged overhead image 60 during teacher driving with the overhead image 61 based on the peripheral images captured during autonomous driving is not limited to the foregoing.

In the present embodiment, the enlarged overhead image 60 of teacher driving is referred to as the first enlarged overhead image 60, and an image obtained by synthesizing the first enlarged overhead image 60 with the overhead image 61 based on the peripheral images captured during autonomous driving is referred to as the second enlarged overhead image, in order to distinguish between these images.

The display control unit 107 of the present embodiment has functions similar to those of the first embodiment, and causes the display device 120 to display the second enlarged overhead image generated by the enlarged overhead image generation unit 106 during autonomous driving. The display processing is an example of a third display step.

Figure 16:
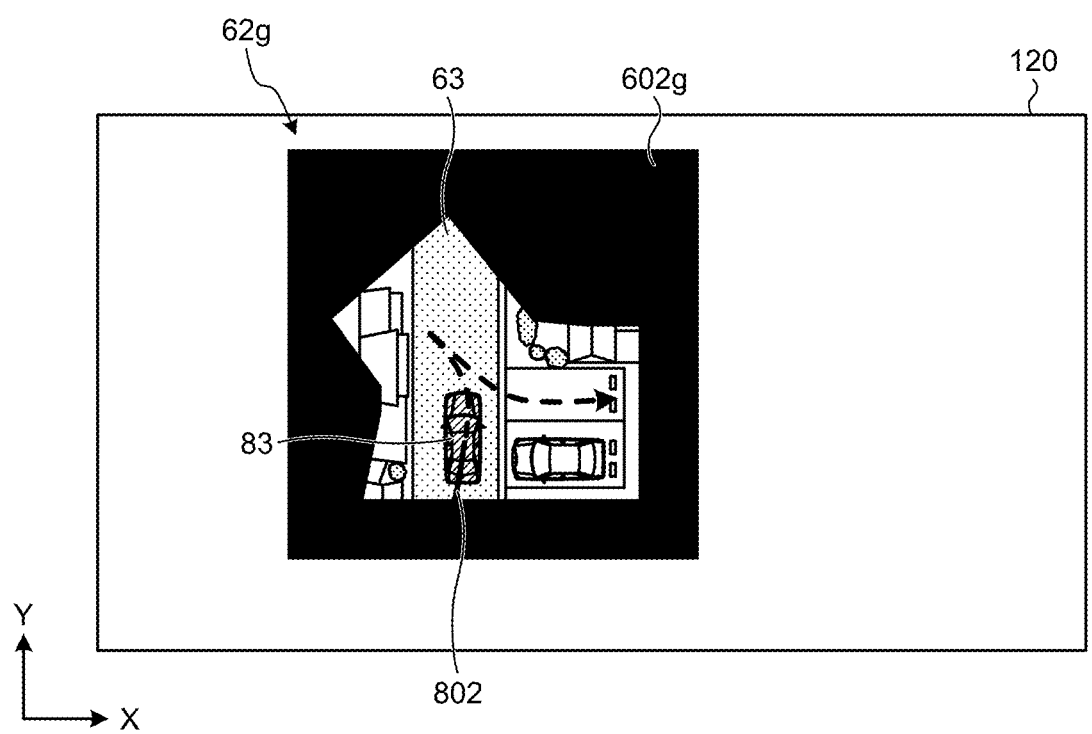
FIG. 16 is a diagram illustrating an example of an overhead route image according to a fifth embodiment.

FIG. 16 is a diagram illustrating an example of an overhead route image 62g according to a fifth embodiment. In a second enlarged overhead image 63 illustrated in FIG. 16, an area, in which peripheral images are captured by the imaging device 16 of the vehicle 1 located in the vicinity of the start position 900 of the travel route 80, is replaced with the overhead image 61 generated during autonomous driving. Further, an area in the second enlarged overhead image 63 in which a peripheral image has not yet been captured by the imaging device 16 is displayed without further processing as the first enlarged overhead image 60.

When the vehicle 1 is traveling autonomously by the vehicle control unit 110, the display control unit 107 displays the overhead route image 62g, which is obtained by superimposing and displaying a travel route image 802 and the vehicle image 83 onto the second enlarged overhead image 63, as illustrated in FIG. 16.

More specifically, the display control unit 107 displays the vehicle image 83 at a point corresponding to the current position of the vehicle 1 on the second enlarged overhead image 63. The display control unit 107 moves the vehicle image 83 on the second enlarged overhead image 63 as the vehicle 1 moves due to autonomous driving.

Moreover, in the example illustrated in FIG. 16, the display control unit 107 uses a solid line to display, in the travel route image 802, a range which the vehicle 1 has already traveled, and uses a broken line to display a range which the vehicle 1 has not yet traveled. With such a display, the user is able to understand the current position of the vehicle on the travel route 80.

Note that the display mode of the travel route image 802 illustrated in FIG. 16 is an example, and the display mode may not be changed depending on whether the vehicle 1 is traveling. In addition, the display control unit 107 may not display the travel route image 802 during autonomous driving.

Moreover, in the example illustrated in FIG. 16, the display control unit 107 displays the overhead route image 62g such that the current front direction of the vehicle 1 faces the Y direction of the display device 120. In this case, when the direction of the vehicle 1 changes, the direction of the overhead route image 62g also changes.

Note that the display direction is an example and may be changeable. For example, the display control unit 107 may have a first display mode in which the overhead route image 62g is displayed such that the current front direction of the vehicle 1 faces the Y direction of the display device 120, and a second display mode in which the overhead route image 62g is displayed such that the front direction of the vehicle 1 at the end point of the travel route 80 faces the Y direction of the display device 120. In the case of the second display mode, the direction of the overhead route image 62g is fixed regardless of the change in the direction of the vehicle 1 during autonomous driving.

For example, the reception unit 101 may receive an operation by the user to select the first display mode or the second display mode. The display control unit 107 displays the overhead route image 62g with the display mode selected by the user.

As described above, in the parking assist method executed by the parking assist device 100 of the present embodiment, the second enlarged overhead image 63 is generated by synthesizing the overhead image 61 generated from the peripheral images captured during autonomous driving of the vehicle 1 based on the travel route 80, with the enlarged overhead image 60 during teacher driving. Moreover, in the parking assist method, the second enlarged overhead image 63 thus generated is displayed by the display device 120. Therefore, with the parking assist method executed by the parking assist device 100 of the present embodiment, the second enlarged overhead image 63 reflecting the current state of the periphery of the vehicle 1 can be presented to the driver during autonomous driving of the vehicle 1 based on the travel route 80.

For example, even in a case where an obstacle or the like exists around the vehicle 1 although it did not exist during teacher driving, the parking assist method executed by the parking assist device 100 of the present embodiment is able to depict the obstacles on the second enlarged overhead image 63.

Modification Example 1

In each of the above-described embodiments, the display device 120 and the operation unit are mounted on the vehicle 1, but may also be provided outside the vehicle 1. For example, the display device 120 and the operation unit may be a tablet terminal or a mobile terminal such as a smartphone that is capable of communicating with the parking assist device 100 in a wireless or wired manner. Note that the tablet terminal or the like need not be directly connected to the parking assist device 100 of the vehicle 1, and that data and a control signal can be transmitted and received via a server device or a cloud environment.

When the display device 120 and the operation unit are a tablet terminal or the like, the driver may use the tablet terminal or the like in the vehicle 1, or may use the tablet terminal or the like in a state of getting out of the vehicle 1.

Alternatively, when the vehicle 1 is provided with a head-up display, the head-up display may be an example of the display device. For example, the windshield 180 of the vehicle 1 may be a head-up display capable of displaying an image by projecting the image through a projection device (not illustrated).

Modification Example 2

In addition, the display timing at which the display control unit 107 of the parking assist device 100 displays the overhead route images 62, 62a to 62g is not limited to the examples described in the above-described embodiments.

For example, the parking assist device 100 of this modification example is provided with a function for receiving an operation by the user to correct the travel route 80. In this case, when the reception unit 101 receives an operation by the user to give an instruction on the displaying of a correction screen for the travel route 80 after the end of teacher driving, the display control unit 107 causes the display device 120 to display the overhead route images 62, 62a to 62g.

An operation by the user to give an instruction on the displaying of the correction screen for the travel route 80 is, for example, an operation to correct the travel route on the overhead route images 62, 62a to 62g. The processing to receive this operation is an example of a correction-operation reception step.

More specifically, the user inputs an operation to correct the travel route 80 by using a finger, a mouse, or the like, to operate the travel route image 801 contained in the overhead route images 62, 62a to 62g. Upon receiving the operation by the user to correct the travel route 80, the parking assist device 100 executes a recalculation on the basis of the correction operation and corrects the travel route 80.

Note that the operation by the user to give an instruction on the displaying of the correction screen for the travel route 80 may be executed in a state where the user is in the vehicle 1, or may be executed by using a tablet terminal or the like as a display device and an operation unit after the user gets out of the vehicle 1. In addition, not only the travel route 80 immediately after being recorded in teacher driving but also the travel route 80 already registered as the travel route for autonomous driving may be corrected by the user operation.

Modification Example 3

In each of the above-described embodiments, the parking assist device 100 utilizes, for the travel route 80, the travel trajectory of the vehicle 1 in teacher driving. However, the parking assist device 100 may generate the travel route 80 by correcting the speed and/or the travel position of the vehicle 1 with respect to the travel trajectory in teacher driving.

Moreover, in each of the above embodiments, the teacher driving causes the vehicle 1 to travel from the start position 900 to the parking space 910 similarly to the travel of the vehicle 1 in autonomous driving. However, the teacher driving may be in a direction opposite to the autonomous driving.

More specifically, the parking space 910 may be set as a starting point for the teacher driving, and the start position 900 may be set as an end point for the teacher driving. In this case, the route recording unit 104 generates the travel route 80 for autonomous driving by converting the teacher driving route to the reverse direction. In other words, the vehicle control unit 110 causes the vehicle 1 to travel from the start position 900 to the parking space 910 in a direction opposite to teacher driving. Such a technique is also called reverse playback of the travel route.

Modification Example 4

Moreover, some of the functions of the parking assist device 100 in each of the above-described embodiments may be executed by an information processing device provided outside the vehicle 1. The information processing device provided outside the vehicle 1 is, for example, a mobile terminal such as a smartphone, a PC, a server device, or the like. Note that the information processing device may be provided in a cloud environment.

While certain embodiments have been described, these embodiments have been presented by way of example only, and are not intended to limit the scope of the inventions. Indeed, the novel methods and systems described herein may be embodied in a variety of other forms; moreover, various omissions, substitutions and changes in the form of the methods and systems described herein may be made without departing from the spirit of the inventions. The accompanying claims and their equivalents are intended to cover such forms or modifications as would fall within the scope and spirit of the inventions.

With the parking assist method and the parking assist device according to the present disclosure, the user is able to easily understand the positional relationship between the travel route of the vehicle based on teacher driving, and objects around the vehicle, and the road.

What is claimed is:

1. A parking assist method for performing autonomous driving of a vehicle on a basis of teacher driving by a driver, the parking assist method comprising:
  acquiring, from an imaging device installed in the vehicle, first captured images obtained by imaging a periphery of the vehicle in time series according to movement of the vehicle during the teacher driving;
  generating, on a basis of the first captured images, a first enlarged overhead image of a display target range viewed from above, the display target range covering a travel route of the vehicle in the teacher driving and a periphery of the travel route;

causing a display device to display the first enlarged overhead image;

moving the vehicle to a parking position by autonomous driving based on the travel route;

acquiring, from the imaging device, second captured images obtained by imaging the periphery of the vehicle in time series according to movement of the vehicle during the autonomous driving;

generating an overhead image from the second captured images;

generating a second enlarged overhead image by synthesizing the overhead image with the first enlarged overhead image; and causing the display device to display the second enlarged overhead image.

2. The parking assist method according to claim 1, wherein the causing of the display device to display the first enlarged overhead image further includes causing the display device to display an overhead route image obtained by superimposing a travel route image indicating the travel route onto the first enlarged overhead image.

3. The parking assist method according to claim 2, wherein the causing of the display device to display the first enlarged overhead image further includes causing the display device to display the overhead route image at an angle at which a front direction of the vehicle at an end of the teacher driving is oriented toward a top of a screen of the display device.

4. The parking assist method according to claim 1, wherein the display target range is a range from a start position to an end position of the travel route in the teacher driving.

5. The parking assist method according to claim 1, wherein the causing of the display device to display the first enlarged overhead image further includes causing the display device to display an outline image representing a movement trajectory of an outline of a vehicle body of the vehicle in the teacher driving, the outline image being displayed by being superimposed onto the first enlarged overhead image.

6. The parking assist method according to claim 5, wherein
the acquiring of the first captured images includes acquiring information on distances between the vehicle and objects around the vehicle during the teacher driving, and
the causing of the display device to display the first enlarged overhead image further includes causing the display device to display, in the first enlarged overhead image, a first area in the outline image where a first distance of the distances is equal to or less than a threshold value in a first display mode, the first display mode being different from a second display mode applied to a second area in the outline image where a second distance of the distances is more than the threshold value.

7. The parking assist method according to claim 1, wherein the causing of the display device to display the first enlarged overhead image further includes causing the display device to display a vehicle image representing the vehicle, the vehicle image being displayed at a position in the first enlarged overhead image where the vehicle is present at an end of the teacher driving.

8. The parking assist method according to claim 1, further comprising:
receiving a user operation to correct the travel route on the first enlarged overhead image.

9. The parking assist method according to claim 1, further comprising:
causing, after more than one teacher driving is executed, the display device to display overhead route images based on the more than one teacher driving; and
receiving a user operation to select one of the overhead route images corresponding to a travel route to be registered.

10. A device for performing autonomous driving of a vehicle on a basis of teacher driving by a driver, the device comprising:
a processor; and
a memory including a program that, when executed by the processor, causes the processor to perform operations, the operations including:
acquiring, from an imaging device installed in the vehicle, first captured images obtained by imaging a periphery of the vehicle in time series according to movement of the vehicle during the teacher driving;
generating, on a basis of the first captured images, a first enlarged overhead image of a display target range viewed from above, the display target range covering a travel route of the vehicle in the teacher driving and a periphery of the travel route;
causing a display device to display the first enlarged overhead image;
moving the vehicle to a parking position by autonomous driving based on the travel route;
acquiring, from the imaging device, second captured images obtained by imaging the periphery of the vehicle in time series according to movement of the vehicle during the autonomous driving;
generating an overhead image from the second captured images;
generating a second enlarged overhead image by synthesizing the overhead image with the first enlarged overhead image; and
causing the display device to display the second enlarged overhead image.

11. The device according to claim 10, wherein, in the causing of the display device to display the first enlarged overhead image, the processor further causes the display device to display an overhead route image obtained by superimposing a travel route image indicating the travel route onto the first enlarged overhead image.

12. The device according to claim 11, wherein, in the causing of the display device to display the first enlarged overhead image, the processor further causes the display device to display the overhead route image at an angle at which a front direction of the vehicle at an end of the teacher driving is oriented toward a top of a screen of the display device.

13. The device according to claim 10, wherein the display target range is a range from a start position to an end position of the travel route in the teacher driving.

14. The device according to claim 10, wherein, in the causing of the display device to display the first enlarged overhead image, the processor further causes the display device to display an outline image representing a movement trajectory of an outline of a vehicle body of the vehicle in the teacher driving, the outline image being displayed by being superimposed onto the first enlarged overhead image.

15. The device according to claim 14, wherein
in the acquiring of the first captured images, the processor acquires information on distances between the vehicle and objects around the vehicle during the teacher driving, and
in the causing of the display device to display the first enlarged overhead image, the processor further causes the display device to display, in the first enlarged overhead image, a first area in the outline image where a first distance of the distances is equal to or less than a threshold value in a first display mode, the first display mode being different from a second display mode applied to a second area in the outline image where a second distance of the distances is more than the threshold value.

16. The device according to claim 10, wherein, in the causing of the display device to display the first enlarged overhead image, the processor further causes the display device to display a vehicle image representing the vehicle, the vehicle image being displayed at a position in the first enlarged overhead image where the vehicle is present at an end of the teacher driving.

17. The device according to claim 10, wherein the operations further include:
receiving a user operation to correct the travel route on the first enlarged overhead image.

18. The device according to claim 10, wherein the operations further include:
causing, after more than one teacher driving is executed, the display device to display overhead route images based on the more than one teacher driving; and
receiving a user operation to select one of the overhead route images corresponding to a travel route to be registered.

* * * * *